Jan. 3, 1939.  E. H. TOMPKINS  2,142,768
PRONGED CLINCHING FINGER HOSE COUPLING
Filed Aug. 4, 1937
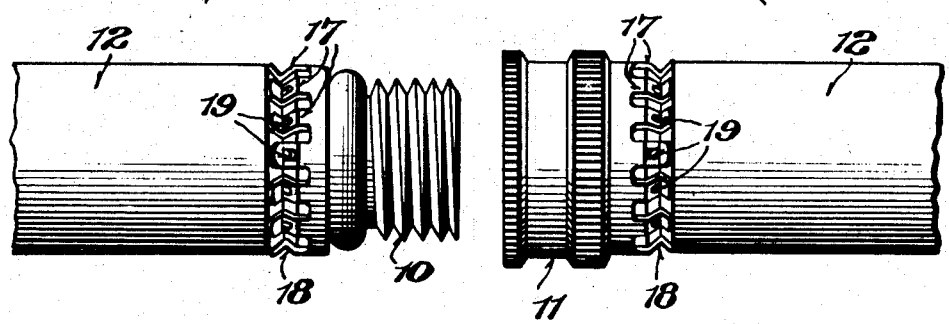
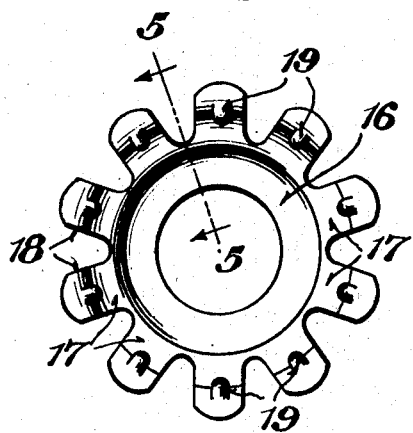
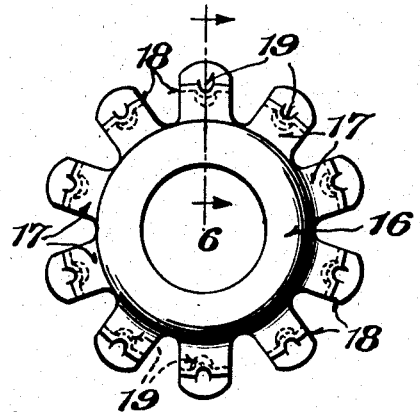
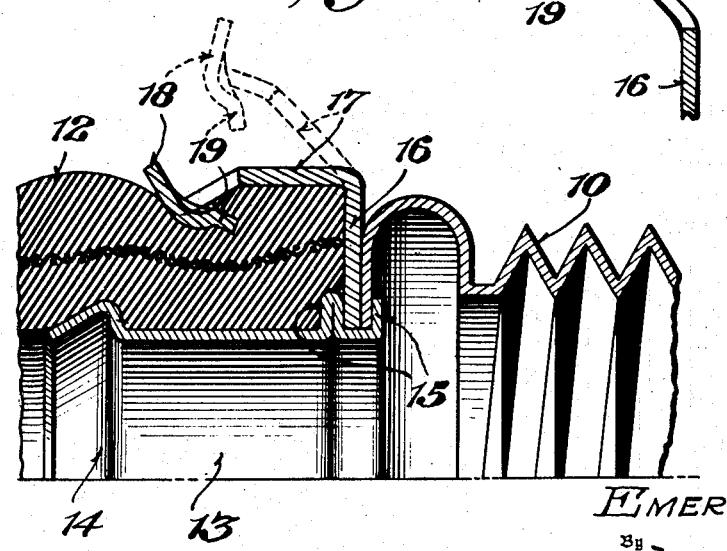
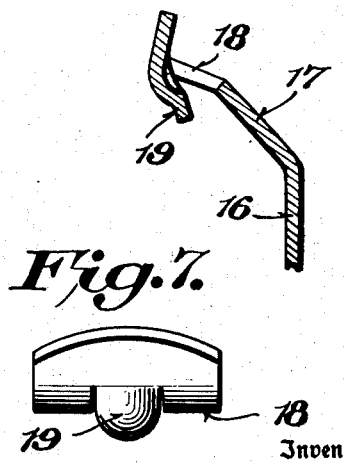
Inventor
EMERSON H. TOMPKINS,
By Mawhinney & Mawhinney,
Attorneys Patented Jan. 3, 1939

2,142,768

UNITED STATES PATENT OFFICE 2,142,768

PRONGED CLINCHING FINGER HOSE COUPLING

Emerson H. Tompkins, Waterbury, Conn., assignor to Scovill Manufacturing Company, Waterbury, Conn., a corporation of Connecticut Application August 4, 1937, Serial No. 157,432

1 Claim. (Cl. 285—84)

The present invention relates to hose couplings, and more particularly to a clincher structure for securing the coupling members to their respective hose ends.

An object of the invention is to improve the types of couplings which are exemplified in the prior patents to Nelson No. 1,179,452 granted April 18, 1916, and to Reutter et al. No. 1,919,860 granted July 25, 1933.

Heretofore, the clinching fingers which are struck or bent over against the outer side of the hose have had inwardly struck prongs, as shown in the Nelson patent above referred to, which engage in the surface portion only of the hose and which have but little resistance to cutting and tearing out through the thin surface portion of the hose, damaging the hose and easily freeing the coupling member therefrom. Further, when those fingers are hammered, or otherwise bent down, into clinching position on the hose the prongs frequently flatten back into their recesses in the fingers and do not bite into the surface portion of the hose. The coupling member may thus be easily pulled from the hose end.

Another difficulty found in the prior art, as shown in the Reutter et al. patent above mentioned, is that when the fingers are ribbed at their inner outer ends a smooth cam surface is provided which does not satisfactorily hold the coupling member on the hose end, even when relatively thick strong fingers are provided. The only holding action is a pinching one on the hose between the ribbed nipple and the ribbed finger.

To overcome the above and other objections found in the prior art is an object of this invention. To this end, the present invention provides fingers with prongs thereon which are offset inwardly on the fingers to such an extent that when the fingers are bent over on the hose the prongs are engaged down into the hose body to a considerable depth at the point of compression of the hose body, leaving the end portion of the hose free to expand behind the prongs and provide a relatively thick deep body portion of the hose for the prongs to work against. The invention also provides a construction which compresses the hose at the point of engagement of the prongs and which prevents damage to the hose by the prongs and offsets any tendency for the prongs to shift in an edgewise direction to cut the hose body.

With the foregoing and other objects in view, the invention will be more fully described hereinafter, and will be more particularly pointed out in the claim appended hereto.

In the drawing, wherein like symbols refer to like or corresponding parts throughout the several views.

Figure 1 is a side elevation of a hose coupling having the members thereof secured to their hose ends by the clincher structure of this invention.

Figure 2 is a detail inner face view of the finger carrying disc, showing the ribbed fingers with the prongs thereon.

Figure 3 is an opposite face view of the same.

Figure 4 is a fragmentary sectional view of a coupling member secured in the hose end by the clincher structure of this invention, the dotted lines showing the initial position of one of the fingers prior to bending into clinching position.

Figure 5 is an enlarged fragmentary section taken on the line 5—5 of Figure 2 showing an edge view of one of the clinching fingers.

Figure 6 is a like view, but showing the finger in section on the line 6—6 of Figure 3, and Figure 7 is a detail enlarged outer end view of one of the clincher fingers, showing the bulged base portion of the prong thereof.

Referring now to the drawing, Figure 1 shows a common type of hose coupling having a threaded hollow plug 10 on one coupling member and a freely turning coupling nut 11 on the other member, the nut adapted to be screwed over the plug 10 to interconnect the hose ends 12.

Both of the coupling members 10 and 11 are secured to their respective hose ends 12 by the improved clincher structure of this invention.

With particular reference to Figure 4, each coupling member, such as the plug 10, is connected to the outer end of a nipple 13 adapted for insertion in the end of a hose 12. The inner end of the nipple 13 has an outwardly disposed annular rib or shoulder 14 which faces forwardly and over which the hose end is expanded or forced, the rib 14 being embedded in the inner wall of the hose 12. In the present instance, the plug 10 is held to the nipple 13 by spaced flanges or crimps 15 outstanding about the outer end of the nipple and receiving therebetween the inturned end of the plug 10 as shown.

Also secured between the flanges 15, and preferably against the inner end of the plug 10, is a clincher disc or flat ring 16. The extremity of the hose 12 is adapted to abut against the disc 16 and against and over the adjacent flange 15 to insure a tight joint and sealing of the hose end on the coupling member.

Radially disposed about the outer marginal edge of the disc 16 are a plurality of clinching fingers 17 which, initially, are inclined at a slight angle backwardly over the nipple 13. The fingers 17 are adapted to be hammered, or otherwise bent, inwardly about and against the end of the hose 12. As clearly shown in Figure 4, the fingers are of a length less than the distance between the disc 16 and the shoulder 14 on the nipple, the difference in length being such that when the fingers 17 are bent down the space between the ends of the fingers 17 and shoulder 14 is less than the thickness of the house 12 so as to compress the hose forwardly of and against the shoulder and force the hose snugly about the intermediate portion of the nipple.

The outer ends of the fingers 17 are transversely crimped to provide a transverse bead 18 across the inner side of each finger. The beads 18, when the fingers 17 are bent inwardly against the hose 12, are adapted to be embedded in the surface portion of the hose and further compress the latter and provide rounded non-cutting shoulders against which the free end of the hose may expand for holding the end of the hose between the fingers. The beads 18 effect the localized deformation and compression of the hose over and against the bead 14 of the nipple.

It has been found, however, due to the rounded surface of the beads 18 and the flexibility of the hose, that the hose end works out from beneath the fingers and the coupling member pulls too easily from the hose end.

To offset this difficulty and at the same time prevent damage to the hose itself, the beads 18 of the fingers 17 are each provided with a prong 19 which is cut, stamped or struck from the bead 18 lengthwise of the finger and with its free end directed toward the finger carrying disc 16. As clearly shown in Figures 5, 6 and 7, the base of the prong 19 is pressed or bulged inwardly from the bead 18 and is of less width than that of the bead so as to present a rounded projection for embedding in the compressed surface portion of the hose to prevent lateral shifting of the bead 18 on the hose and the cutting of the hose beneath the bead. The extremity of the prong 19 diverges from the shank of the arm 17 sufficiently to penetrate the surface portion of the hose at a point radially inward of the bead and at a substantial depth in the expanded hose end. The prong 19 thus has a firm purchase against the thick expanded end of the hose and the prong cannot be torn through the body portion of the hose. The prong 19 is of less width than that of the bead 18 so that the latter bears against the expanded hose end and prevents splitting and tearing thereof by the prong.

While the above description has set forth the improved clincher structure in connection with one type of coupling member 10, it is of course to be understood that the nipple 13 with the clincher disc 16 and its arms 17 may be connected to the inner end of any other suitable type of coupling member, such as the coupling nut 11.

The coupling members are manufactured independently of the hose 12, and in their initial form, the arms 17 extend outwardly at an overhanging angle as shown in Figures 4, 5 and 6. The nipple 13 is driven into the cut or open end of the hose 12 to its fullest extent, until the extremity of the hose abuts the disc 16. In this position the rib or bead 14 on the inner end of the nipple is embedded in the inner wall of the hose 12, deforming the same as shown in Figure 4 so that the hose is frictionally held over the nipple 13 and is free to contract about the intermediate portion of the nipple 13.

The clincher arms 17 are now bent down about the hose. This is accomplished, generally, by hammering and forcing the arms 17 down into the full line position shown in Figure 4. During the bending inwardly of the arms, the spurs 19 penetrate the outer portion of the hose 12 and the portion of the hose 12 adjacent the spurs 19 is compressed not only by the transverse ribs or beads 18 but also by the bulged base portions of the spurs 19. The free ends of the arms 17, carrying the transverse ribs 18 and the spurs 19, are forced into the hose end 12 outwardly of the zone of the rib 14 of the nipple so that the hose 12 is compressed and deformed over and about the rib 14 and between the latter and the ribs 18 of the arms.

The important feature of this invention is that the spurs 19 are spaced radially inward a considerable distance from the arms 17 so that the spurs are embedded deeply into the body portion of the hose 12, and the free end of the hose is permitted to expand against the inner sides of the arms 17 and provide an annular relatively thick and solid body portion of the hose for the spurs to work against. Thus, the spurs 19 cannot easily cut through or disrupt the surface portion of the hose when axial strain is imposed through the coupling and hose. The spurs 19 are also embedded in a firm solid portion of the hose incident to the proximity of the transverse beads 18 and the bulged base portions of the spurs. The clincher action upon the hose is thus a solid one and the hose is firmly held to the nipple 13 and is deformed substantially to the exterior configuration thereof.

It is obvious that various changes and modifications may be made in the details of construction and design of the above specifically described embodiment of this invention without departing from the spirit thereof, such changes and modifications being restricted only by the scope of the following claim.

What is claimed is:

In a clincher hose coupling, a nipple adapted for insertion in the end of a hose and provided with an annular bead upon its inner end adapted to be embedded in the inner wall of the hose, a clincher disc mounted on the outer portion of the nipple and having a plurality of radial arms adapted to be bent inwardly over the hose on the nipple, said arms having transverse ribs extending inwardly from their outer ends for embedding in the outer portion of the hose to compress the latter against said annular rib of the nipple, said transverse ribs of the arms having inwardly pressed spurs directed toward said disc and adapted for embedding in the outer portion of the hose, the construction and arrangement being such that as the spurs and ribs are forced into engagement with the hose the hose is forced into contact with the disc and distorted to fill the space between the nipple and the arms.

EMERSON H. TOMPKINS.